(12) United States Patent
Miller et al.

(10) Patent No.: US 10,179,378 B2
(45) Date of Patent: *Jan. 15, 2019

(54) ODOR REDUCTION IN LASER PROCESSED MATERIAL WITH CURL REDUCTION

(71) Applicant: Preco, Inc., Somerset, WI (US)

(72) Inventors: Daniel B. Miller, New Richmond, WI (US); Brian Lindahl, Somerset, WI (US); Christopher Chow, Lake Elmo, MN (US)

(73) Assignee: PRECO, INC., Somerset, WI (US)

( * ) Notice: Subject to any disclaimer, the term of this patent is extended or adjusted under 35 U.S.C. 154(b) by 1073 days.

This patent is subject to a terminal disclaimer.

(21) Appl. No.: 13/891,814

(22) Filed: May 10, 2013

(65) Prior Publication Data

US 2013/0299492 A1 Nov. 14, 2013

Related U.S. Application Data

(60) Provisional application No. 61/645,202, filed on May 10, 2012.

(51) Int. Cl.
*B23K 26/16* (2006.01)
*B23K 26/70* (2014.01)
(Continued)

(52) U.S. Cl.
CPC .......... *B23K 26/38* (2013.01); *B23K 26/402* (2013.01); *B23K 26/70* (2015.10); *B23K 26/702* (2015.10);
(Continued)

(58) Field of Classification Search
CPC ...... B23K 26/422; B23K 6/406; B23K 26/38; B29C 2791/009
See application file for complete search history.

(56) References Cited

U.S. PATENT DOCUMENTS 2,204,520 A * 6/1940 Walker ................. C14C 11/003
427/384
2,973,530 A * 3/1961 Bromfield .............. A43D 11/14
12/1 A
(Continued)

FOREIGN PATENT DOCUMENTS

DE 102004048360 A1 4/2006
RU 2009118612 A 11/2011
WO 2012103540 A1 8/2012

OTHER PUBLICATIONS

English translation of DE 102004048360, Derwent No. 2006-285437, Apr. 13, 2006, 2 pages.*
(Continued)

*Primary Examiner* — Matthew J Daniels
(74) *Attorney, Agent, or Firm* — Westman, Champlin & Koehler, P.A.; Z. Peter Sawicki; Amanda M. Prose

(57) ABSTRACT

The present invention includes methods for treating laser-processed materials having an odor generated during the laser processing. The present method includes treating the laser-processed materials with heat to dissipate the odor from the material. The laser processed material may be secured to avoid curling during the heating process. The method can also include a cooling step after heating of the laser-processed material. Multiple cycles of heating and cooling may also be performed to substantially reduce or eliminate the odor from the laser-processed material. The invention also includes articles made according to the method and apparatus for producing laser processed materials having substantially reduced odor.

15 Claims, 6 Drawing Sheets

(51) Int. Cl.
*B23K 26/38* (2014.01)
*B65D 25/00* (2006.01)
*B23K 26/402* (2014.01)
*B23K 103/00* (2006.01)

(52) U.S. Cl.
CPC ............ *B23K 26/703* (2015.10); *B65D 25/00* (2013.01); *B23K 2103/34* (2018.08); *B23K 2103/40* (2018.08); *B23K 2103/50* (2018.08)

(56) References Cited

U.S. PATENT DOCUMENTS

| | | | | |
|---|---|---|---|---|
| 4,839,181 | A * | 6/1989 | MacMurray | A23N 7/00 |
| | | | | 426/237 |
| 5,394,227 | A | 2/1995 | Huffman et al. | |
| 5,552,818 | A * | 9/1996 | Agano et al. | 347/133 |
| 5,557,311 | A | 9/1996 | Perrington et al. | |
| 5,767,481 | A | 6/1998 | Graf | |
| 5,891,764 | A | 4/1999 | Ishihara et al. | |
| 5,897,797 | A * | 4/1999 | Drouillard | A01J 27/005 |
| | | | | 101/3.1 |
| 5,990,444 | A | 11/1999 | Costin | |
| 6,306,493 | B1 * | 10/2001 | Brownfield | 428/327 |
| RE39,001 | E * | 3/2006 | Lundquist | G11B 5/102 |
| | | | | 219/121.69 |
| 2005/0079257 | A1 * | 4/2005 | Neto | 426/383 |
| 2005/0088654 | A1 | 4/2005 | Hu et al. | |
| 2008/0317929 | A1 | 12/2008 | Popplewell et al. | |
| 2010/0116801 | A1 | 5/2010 | Mukai et al. | |
| 2011/0045237 | A1 * | 2/2011 | Ripley | B44C 1/228 |
| | | | | 428/131 |
| 2011/0261141 | A1 | 10/2011 | Costin, Sr. et al. | |

OTHER PUBLICATIONS

English translation of DE 102004048360 by Noack, Nov. 2016, 4 pages.*
International Search Report and Written Opinion; PCT/US2013/040566; dated Sep. 5, 2013.
Tice, P. A., Offen C. P. Odors and taints from paperboard food packaging. Tappi Journal. 77(12) 149-154 (1994).
Smock, Gary, Handbook for Pulp & Paper Technologists, Second Edition, Angus Wilde Publications, Copyright 1992, Chapter 17, pp. 264-282.
Table Top Roll Laminator RSH-380 website, Royal Sovereign, Version available May 7, 2011, 2 pages.
Extended European search report issued in related European Patent Application No. 13787395.6-1702/2846959 dated Jun. 3, 2016.

* cited by examiner

FIGURE 2
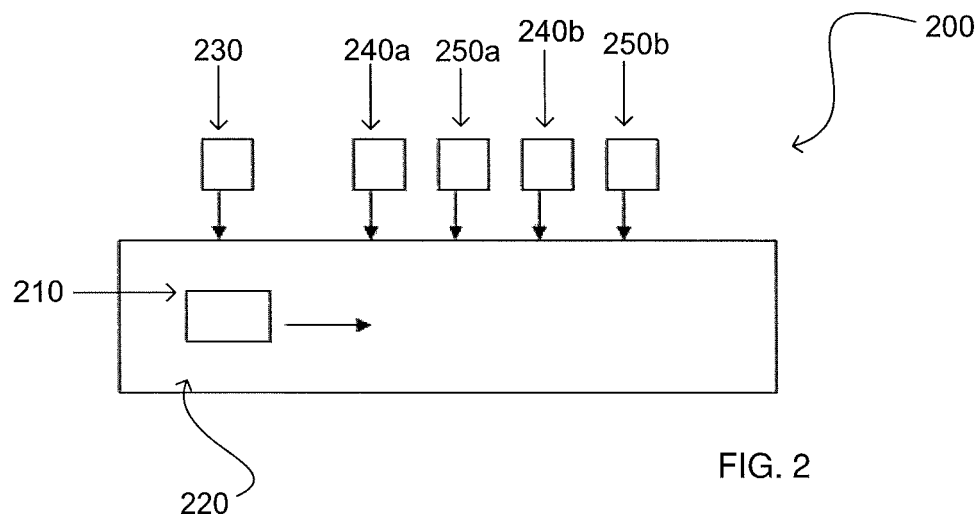
FIG. 2
FIGURE 3
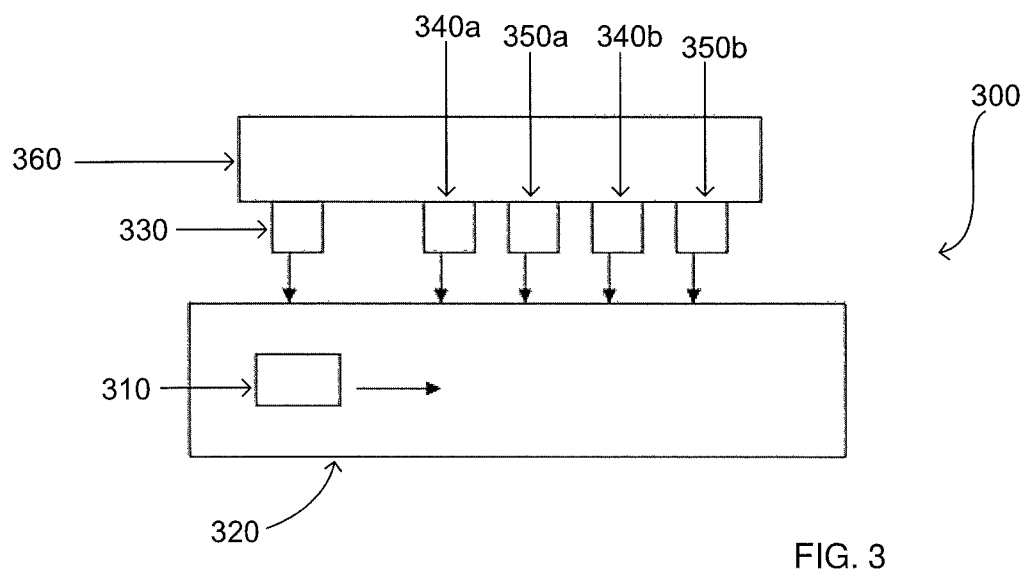
FIG. 3

ODOR REDUCTION IN LASER PROCESSED MATERIAL WITH CURL REDUCTION

CROSS REFERENCE TO RELATED APPLICATION

The present application is based on and claims the benefit of U.S. provisional patent application Ser. No. 61/645,202, filed May 10, 2012, the content of which is hereby incorporated by reference in its entirety.

FIELD

The present invention relates to laser processing of materials, and more particularly to reduction of odor caused by laser processing.

BACKGROUND

Lasers are well-known devices used in many areas of industry including production of packaging materials. Production of packaging materials has conventionally been performed by die based systems. Conventional die based systems require not only large areas to store the dies, but also time to set a die to run a particular package configuration. The use of lasers offers the ability to produce packaging based on a digital format. An almost endless library of digital patterns can be neatly stored and organized on computing devices. These patterns are readily available for loading into laser based systems and can be ready to begin new production jobs in a fraction of the time that was needed for a die based system.

Use of laser-based systems allows companies the potential to eliminate conventional die based converting, along with the costly manufacture, maintenance, storage, and changeover costs associated with dies. While dies may continue to be the tool of choice for a number of applications, they are not always the best choice. As the laser industry continues to advance and mature, more and more applications have and will become laser based. Finer and more intricate packaging products can be cut with laser based than dye based systems One of the advances necessary for this continued growth lies in the area of reduced post processing odor. While lasers offer a number of advantages, one of the disadvantages can come in a lingering odor that may be present post processing or converting. The odor can be a burnt odor and is undesirable in a number of applications of the converted materials. A large number of the high speed laser processing systems are $CO_2$ based which operate in the mid infrared region and as such are heat based. The majority of the residue in laser-processed material is removed during processing in the form of vapor and particles. However, some can remain and cause an unacceptable odor. Porous materials can make this matter worse as odor causing compounds can be trapped in the porous areas. Paperboard is one such material that is well suited for converting with the $CO_2$ laser. Unfortunately, paperboard can have an unacceptable odor post laser processing. In some areas of industry this odor is minimal and is tolerable while in others it is unacceptable.

SUMMARY

This disclosure includes a method for reducing odors from a material, the odor having been caused by laser processing of the material. The method comprises heating the material to a temperature sufficient to substantially reduce the odor. The material is retained in a substantially flat position during the odor reduction process to reduce curling.

This disclosure also includes an article produced in part by utilizing a laser with the laser processing causing an odor and the odor having been substantially reduced or eliminated by heat treatment. Areas that are adjacent the laser processing are retained in a substantially flat position such that any curling effect during odor reduction process has been reduced or eliminated.

This disclosure also describes an apparatus for processing a material by directing a laser beam onto the material at a selected region. The apparatus also includes a heating source for heating the material to reduce odor caused by the laser processing of the material and includes a mechanism for retaining the selected region in a substantially flat position while the odor reduction process is occurring.

This disclosure also describes an apparatus for laser processing a material, the apparatus comprising a first laser system for producing a laser beam of a first selected wavelength, the wavelength being of a type that is absorbed by a material sufficient to score or cut the material and a second laser system for producing a second laser beam of a selected wavelength, the second selected wavelength being absorbable by the material sufficient only to heat the material thereby reducing the odor of the material produced by the first laser beam.

BRIEF DESCRIPTION OF THE DRAWINGS

FIG. 2 is a schematic diagram of an apparatus for reducing odors in laser processed materials.

FIG. 3 is a schematic diagram of an apparatus for reducing odors in laser processed materials.

DETAILED DESCRIPTION

Figure 1A:
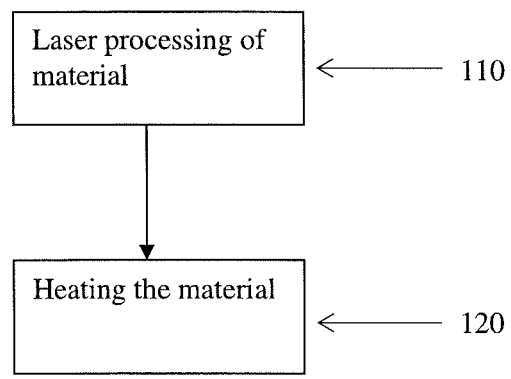
FIGS. 1A, 1B and 1C are flow diagrams of a process for odor reduction in laser processed materials.

This disclosure relates to methods and apparatus for reduction of odor in materials that have been processed using a laser system. Such laser processing, for example, includes cutting and scoring. It has been found that the odor arising from the use of a laser system is reduced significantly by the application of heat to the material. Heat is applied using a variety of techniques. In some embodiments, one or more cycles of heating and cooling have been found to be advantageous for eliminating substantially most of the odor from the laser processed material. In other embodiments, applying only heat is sufficient to eliminate the odor.

This disclosure also includes articles made from material, particularly porous material processed by a laser that are substantially odor-free. The articles can be used immediately after odor reduction without the presence of the offending odor that is generated during laser processing. The articles can be treated by heat to reduce or eliminate the odor. In addition, the articles made from the laser-processed material do not display any significant discoloration.

This disclosure also describes an apparatus that is used to reduce odor in and/or eliminate odor from material processed by a laser. The apparatus includes a heating system to heat the material for reducing or eliminating the odor. The laser treated material is heated immediately after being processed by the laser, although the material may be heated sometime afterwards. Immediate heating can result in better process efficiencies. The material may be treated with heat concurrently during the laser processing. The material may also be pretreated with heat prior to laser processing.

A cooling step after heating in some situations helps in further reducing or eliminating the odor by allowing the use of multiple heating cycles. The act of cooling in and of itself is not suspected to have any odor reduction affect. The apparatus may then also include a mechanism for cooling the material after it is heated for multiple heating cycles.

The apparatus may also include a laser system that processes the material with the laser and then immediately heats the processed material after it has been processed by the laser. The apparatus may then include a cooling system for cooling the material immediately after the material is heated. The laser system, the heating system and the cooling system can be in a variety of configurations as described herein.

A laser system or a laser-based system as referred to herein relates to a system that processes materials through the use of laser technology. Lasers are used in a variety of ways to produce packaging for products.

Many products are packaged in paperboard that is a thick paper-based material. It is derived from wood pulp and more recently from recycled waste paper (which also has its origin from wood pulp). It should be understood that paperboard may be called by other names, such as cardboard, kraft board, and the like.

Paperboard is generally thicker than paper (usually over 0.25 mm) and is typically in individual sheets or in a continuous sheet drawn from a roll. From the paperboard, packaging blanks are cut and portions of the blanks may also be scored so the blanks can be bent to form the walls of the package. Certain other portions can also be scored to form flaps that overlay each other and are then secured to each other by a suitable adhesive or cut slot to form the package.

In recent years, lasers are being used more to cut and score packaging blanks. Lasers provide a very efficient method of cutting and scoring packaging blanks over the old mechanical die systems. Lasers cut and score through the use of a collimated amplified beam of light that terminates in a focal point. It is at the focal point of the beam that cutting and scoring takes place. Intense heat at the focal point cuts and scores the paper in what can be described as essentially a burning process. A by-product of burning a cellulose based material is the distinctive odor of burnt paper. In many packaging applications, this distinctive burnt paper odor is not troublesome. However, there are applications in which the odor is objectionable. One such application is cigarette packaging. Consumers often smell cigarette packages and expect a distinctive tobacco aroma. When the package is cut and scored by a laser, the burnt paper odor may taint the tobacco aroma (as well as the tobacco flavor itself) and be found objectionable. Such a burnt paper order would also be objectionable in other applications such as perfume boxes, scented soaps and the like.

Lasers have also been recently used to mark (etch) or cut leather products. (See U.S. published application 2011/0045237) Again, a distinctive odor is caused by burning leather with a laser. Leather is a product which has certain desirable olfactory characteristics. The odor of burnt leather would work against the desirable "leather smell" that most consumers are familiar with and desire. This disclosure also encompasses manmade materials that simulate leather.

Although cellulose based materials and leather are specifically mentioned herein, this disclosure encompasses other materials that can be processed by a laser and because of such processing a burnt odor is developed and may be found objectionable.

A variety of materials can be processed by lasers and this processing can result in an undesirable odor. These materials may be porous materials. Materials may be natural or organic materials. A natural material is any product derived from plants or animals. Natural materials may include silk, leather, flax, linen. The materials, for example, may be for use in the textile industry. Materials may also be synthetic or manmade materials. This disclosure also encompasses materials that are manmade such as polymeric sheets whether comprising a single polymeric layer or multiple layers of different polymers that are common in present day packaging. The manmade materials can be polycarbonates, acrylics, polyesters and the like. This disclosure also encompasses cellulose based packaging which includes a paperboard layer or the like that is combined with one or more polymer layers or one or more polymer layers with one or more cellulose based layers. In addition, any of the aforementioned may include a metallic layer that is coated on or between layers using well-known techniques. The materials can also be food products such as meats, vegetables including processed foods such a hot dogs.

The materials appropriate for the present invention generally have trapped odors when the material is processed by the laser system. Treatment of the laser-processed material by the methods described herein can remove or substantially diminish the odor.

Figure 1B:
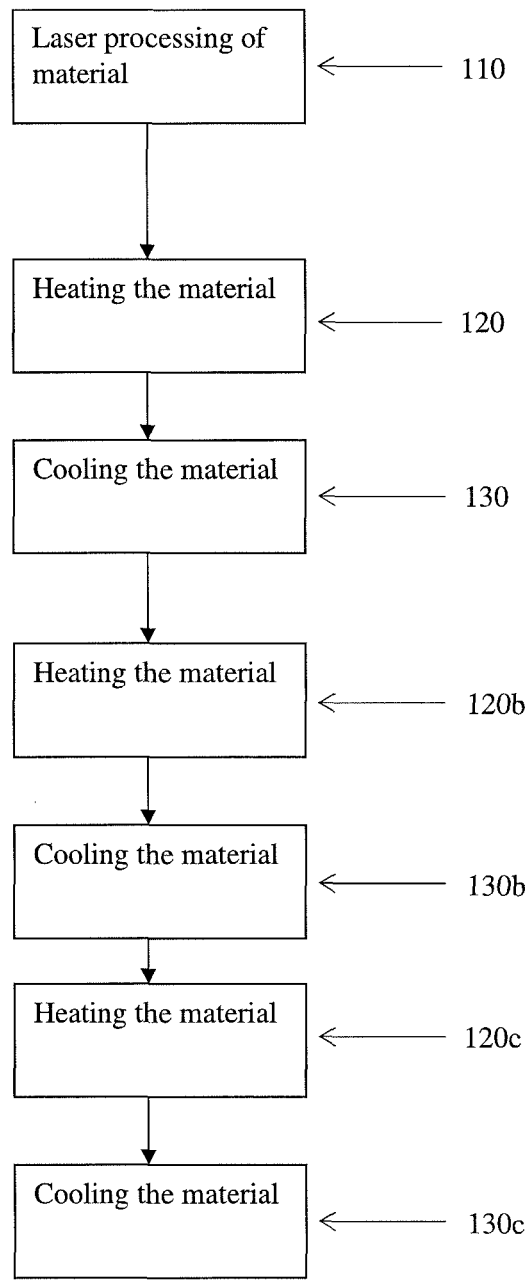
Figure 1C:
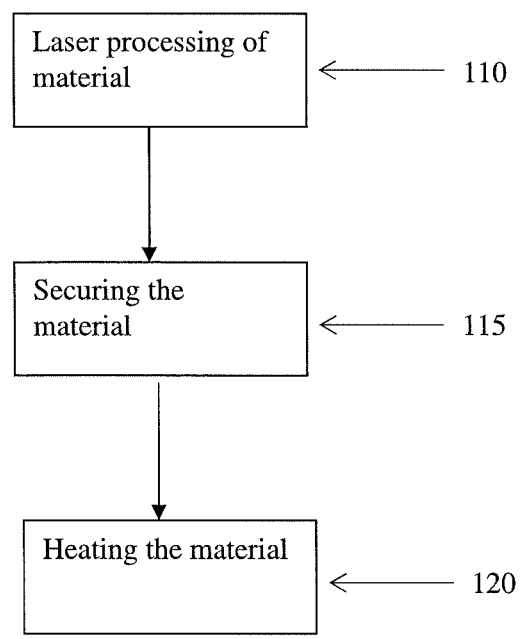

Methods for processing materials resulting in a product or article wherein the odor has been substantially reduced or eliminated are illustrated in FIGS. 1A, 1B and 1C. A first method as illustrated in FIG. 1A includes step 110 of processing a material using a laser system. A variety of methods can be used to convert the material described herein and can be dependent on the specific end use of the package. The laser system is generally used to process the material into sizes that can be assembled together to form a desirable type and size of package.

Methods to reduce the post-laser processing odor include step 120 of heating the material processed in step 110. Without being bound by any theory, it is believed that heating liberates and or vaporizes or decomposes the residual odor causing components produced by laser processing that can be trapped in the material. Heating of the processed material in step 120 can be accomplished using a number of different techniques. Heating can be accomplished via radiation, conduction currents, convection currents and/or chemical applications. Various gases can be utilized to apply the heat as well. In some preferred embodiments, heating is accomplished using infrared sources. Infrared sources may be a typical incandescent lamp or a quartz incandescent lamp. Other infrared sources include wire heating elements, ceramic and quarts tungsten heating elements, and gas-filled radiant heaters. Heat treatment can also be performed using heat guns, heat plates, heated rollers, heated roller laminator, heat lamps, ovens, microwave ovens and the like.

Figure 1D:
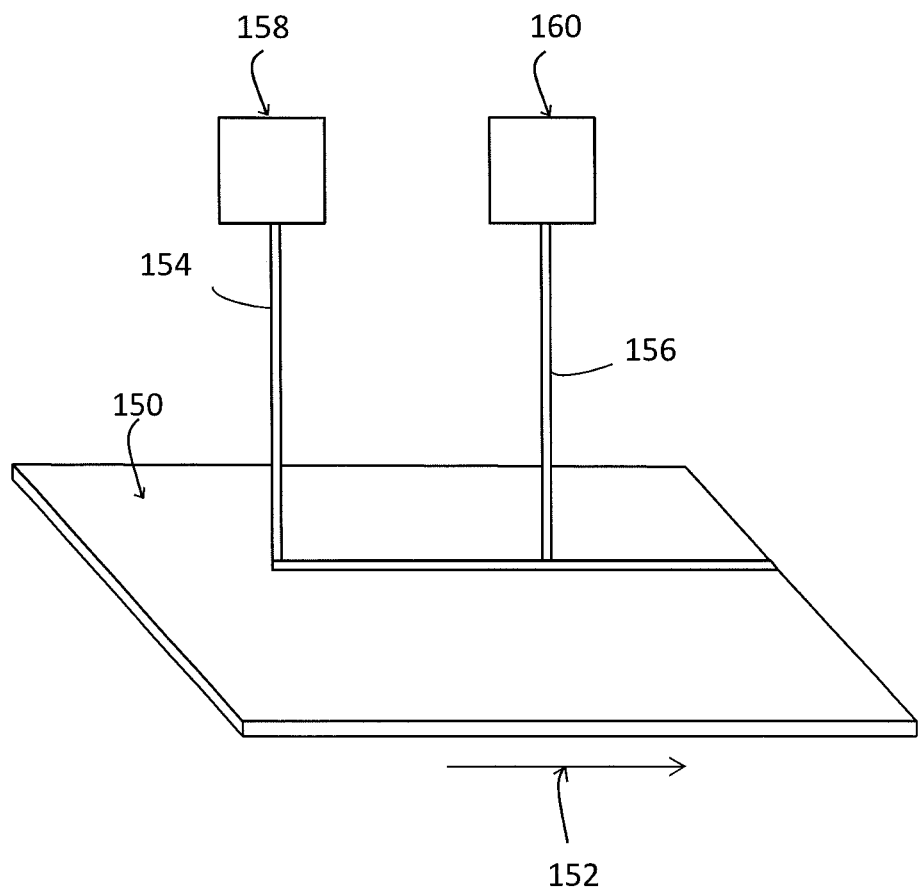
FIG. 1D is a perspective view illustrating a laser system comprising first and second laser beams for both cutting or scoring and then heat treating.

Heat treatment can also be performed using lasers. Heat treating the material to reduce odor in a localized manner has been found to be advantageous in certain applications. The localized heating may be carried out with a second laser, operating at a selected wavelength that does not cut or score the article but provides sufficient heat to reduce the odor. The use of a second laser is illustrated in FIG. 1D. The material 150 being processed is, for example, part of a web that is travelling in a direction indicated by arrow 152. Laser beam 154 is being provided by a laser (not shown) and through a laser delivery system (also not shown) which directs the laser beam onto the material 150 for either scoring or cutting the material. A second laser beam 156 being produced by a second laser (not shown) and transmitted by a delivery system (also not illustrated) projects the laser beam in a precise and localized manner onto only the portion of the material 150 that has been cut or scored by laser beam 154. The second laser beam 156 is of a wavelength such that the energy of the laser beam 156 is not absorbed by the material 150 sufficient to score or cut the material but sufficient to heat the material thereby eliminating the odor produced by laser beam 154.

There are many advantages to precise and/or localized heating of the material. Some of these advantages include preventing curling during heat treatment to maintain lay-flat properties, particularly, in cellulose/paper based materials. Localized heating with a laser at a selected wavelength to reduce odor also avoids scorching of the material and discoloration of the cut material which is especially useful when processing material that is color printed. The overall moisture content of the cut material may be preserved through precise localized heating, treating only the cut area. Precise localized heating also may help to preserve the chemical composition of the material in the uncut areas and avoid decomposition of the uncut areas since the precise localized heat treatment occurs only on the odor-forming areas. It has been found that certain siloxane compounds have been preserved when paper products have been heat treated in this manner. The precise localized heat treatment of the cut areas involves the use of a laser at a wavelength to which only the odor forming materials in the cut area are substantially affected. In a specific example, discoloration of the cut material was avoided and moisture content and chemical composition were preserved with the elimination of odor.

When heat treating the cut area with a laser, the laser wavelength may be varied depending on the odor forming material. In one example, substantial reduction of the odor of cut paper was found to be accomplished using a near IR laser and the paper did not show any sign of curling, scorching, discoloration, or alteration of chemical composition. The method of heat treating material in a precise manner using a laser and either concurrently or sequentially processing the material can be accomplished by a laser cutting system, each laser operating at a different wavelength in which the laser beams are configured and focused largely in a coplanar fashion on the material. In such a system, one system performs the cutting and the other performs the odor eliminating heat treatment either concurrently or sequentially to the cutting process operated by the cutting laser beam. An alternative configuration could include two laser beam paths which operate in a co-linear fashion sharing the same control system and beam manipulation system to guide the laser beams towards selected cutting/heat treating surface areas. By co-linear is meant that the laser beams travel along the same space/path for at least the terminal portion of the beam travel just prior to engaging the material to be processed. Although cellulose/paper based material has been specifically discussed with respect to heat treatment by a second laser, it should be understood that other materials mentioned herein that have been processed by a laser and heat treated by other methods of heat treatment can also be heat treated by the second laser.

Other methods of supplying heat are also within the scope of this invention. Heating treatment can involve the cycling of low to high temperatures and/or high to low temperatures. In alternative embodiments, step 110 and step 120 can be conducted simultaneously as opposed to sequentially. In other words, the laser-processed materials can be treated with heat during laser processing as opposed to after laser processing. In yet other embodiments, the materials may be preheated to a desired temperature and then laser processed. Without being bound by any theory, maintaining the temperature at a temperature above the vaporization or decomposition of the generated odor compounds may release the odors as they are created.

The temperature that the material is exposed to during the heat treatment can vary. The temperature may be dependent on the exact material that is used and the length of the exposure to the heat. It is most important that the material be elevated to an optimum temperature for most effective odor reduction. Generally, the material is exposed to temperatures below the scorching temperature of the material. The heating of the material is done in a manner that generally avoids scorching or significant discoloration of the material treated. Scorching or significant discoloration as referred to herein relates to an unacceptable discoloration of the product from the normal color and is generally visually detectable. In addition, heating of the material does not detectably damage the texture of the material. Preferably, the texture of the material is similar to the rest of the material both visibly and to the touch.

The temperature can be, for example, between about 200° F. and about 500° F. For some materials, temperatures above 500° F. may result in scorching of the material. In some preferred embodiments, the temperature of the surface to be treated is between about 300° F. and about 400° F. Temperatures outside this range are also within the scope of the invention.

The duration of the exposure to heat can vary based on the material, the heat source, the heating temperature and the like. In some exemplary embodiments, the laser processed materials are exposed to heat between about 1 second and 20 seconds to sufficiently raise the temperature of the material for optimum odor reduction. With the appropriate heat delivery method the exposure duration can be kept to a minimum. In the case of treatment with laser having specific wavelength, the time exposure can be substantially less than a second.

Heating or treatment of the laser-treated material is performed with consideration to the physical properties of the material. Curling, moisture content, discoloration, and other physical properties are generally considered when determining the specific heating regimen for a particular material. The moisture content of the material, for example, may be critical to avoid curling. It is believed that curling of cellulose/paper based materials may be due to products' initial moisture content, rate of moisture removal during heating, differential heating through the thickness of the material, and other factors not presently known. However, it is well known that paper based material tends to curl when heated which is undesirable.

As further illustrated in FIG. 1B, the methods for reduction of odor may, optionally, include step 130 of cooling the materials, preferably after the heating step 120. Cooling in step 130 can be accomplished using a variety of techniques including the use of fans, air knifes, cooling plates and the like. Cooling can generally be for short periods of time sufficient to reduce the temperature of the material to allow additional heating cycles if deemed beneficial. Cooling may occur between heating steps as heat dissipates from the material. The material can be cooled, for example, for as quickly as 0.8 seconds, preferably at least 1 second. In some exemplary embodiments, the heated material is cooled between about 1 second and about 60 seconds. The cooling may be directed to only one surface. Alternatively, the cooling may be directed to both surfaces.

The methods for reduction of odor can optionally include additional steps 120b, 130b, 120c and 130c. Steps 120b and 130b represent a second cycle of heating and cooling. Steps 120c and 130c represent a third cycle of heating and cooling. In some embodiments, the materials are exposed to multiple heating and cooling cycles. In some other embodiments, the laser processed materials is exposed to at least 2-3 cycles of heating and cooling are performed to reduce or eliminate the odor. More than 3 cycles of heating and cooling may also be performed and are all within the scope of this invention.

In some preferred embodiments, the methods can include securing and retaining the materials in a substantially flat position to reduce curling of the laser-processed area or edge. The material, in some situations, needs only be retained substantially flat in regions adjacent the laser-processed area or edge. The materials may be secured prior to laser-processing, after laser-processing but prior to heating. Alternatively, the material may be secured immediately after heating but prior to cooling. FIG. 1C illustrates an exemplary embodiment where the material is processed by a laser, secured, and then heated to eliminate the odor. Securing may be performed by any number of methods known in the art. The material may be secured by clamping, tacking, applying pressure or vacuum, and the like. Whole or part of the material being processed may be secured. Preferably, at least the edge or area processed by the laser is secured to avoid curling of the laser-processed area when it is heated to remove or reduce the odor generated from laser-processing.

The methods described herein can substantially reduce or eliminate the odor of materials that have been processed using a laser system. Testing of odor reduction is a subjective test as presently there is no quantitative odor detecting equipment. The odor can be evaluated by subjectively sniffing the material and comparing it to a reference sample. Preferably, at least about 85 percent of the odor is eliminated and, more preferably at least about 95 percent of the odor is eliminated by the methods described herein. In some exemplary embodiments, about 95 percent to about 99 percent of the odor is eliminated.

In some embodiments, the elimination or reduction of odor can be determined by the use of taint and odor tests. An exemplary taint and odor test is the Robinson test and it is described in Tice et al. incorporated herein by reference. (Tice, P. A. and Offen, C. P. Tappi Journal Vol. i77, No. 12. P. 149-154) The cellulose based laser-processed materials generated using the methods described herein advantageously pass the taint and odor test ASTM Standard E 619-84.

An apparatus for processing the porous materials is illustrated in FIG. 2 at 200 and includes units for converting, heating and cooling systems illustrated as separate units for ease of explanation but in practice may be integrated together. Apparatus 200 includes laser system 230 for converting and heating system 240a for heating the laser treated materials. The apparatus may also include cooling system 250a. Material 210 is placed on conveyor 220 in a manner that laser system 230 can process material 210. After processing by laser system 230, material 210 is heated by heating system 240a and then cooled by cooling system 250a. FIG. 2 also includes a second heating system 240b and a second cooling system 250b. Material 210 can be treated further by another heating/cooling cycle by heating system 240b and cooling system 250b. Heating system 240a and 240b may apply heat to one surface of the material. Alternatively, heating system 240a and 240b may be configured to apply heat to more than one surface of the material. Cooling system 250a and 250b may direct cooling to one surface of the material. Alternatively, cooling system 250a and 250b may be configured to direct cooling to more than one surface of the material. FIG. 2 illustrates an embodiment having two heating systems and two cooling systems to treat the materials to two cycles of heating/cooling. In some embodiments, additional heating and cooling systems may also be employed. In other embodiments, only one heating system (or one heating and cooling system) may be employed.

Alternatively, an apparatus may include only one heating system (or one heating and cooling system) but the material may by treated to multiple cycles of heating and cooling by the same heating and cooling system. The processed material is transported back and forth between heating system and the cooling system for the desired number of cycles.

FIG. 3 illustrates another embodiment of an apparatus for processing materials. Apparatus 300 includes converting, heating and cooling systems as one unit. Apparatus 300 includes laser system 330, heating system 340a and 340b and cooling system 350a and 350b. All of these systems are operably connected by controller 360. Controller 360 can be programmed to operate laser system 330, heating system 340a and 340b and cooling system 350a and 350b in a desired manner as material 310 is conveyed on conveyor 320. Apparatus 300 is shown with two heating and cooling systems. Apparatus with one heating system and one cooling system as well as apparatus with more than two heating and cooling system are also within the scope of this invention.

Figure 4:
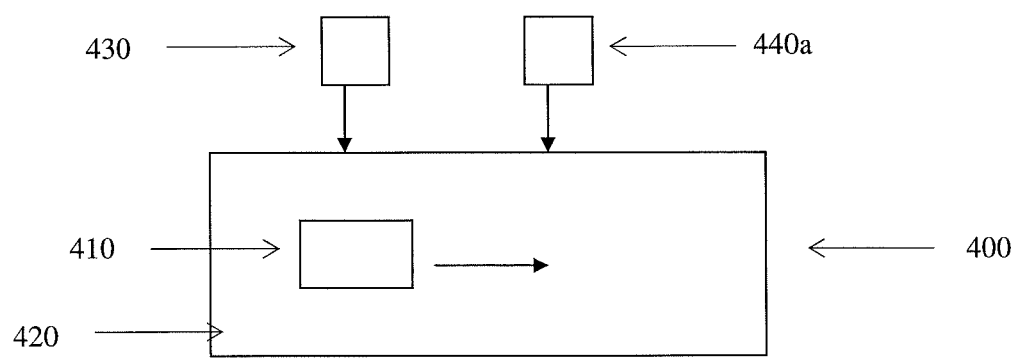
FIG. 4 is a schematic diagram of an apparatus for reducing odors in laser processed materials.

FIG. 4 is a schematic of another apparatus for processing materials. Apparatus 400 includes converting and heating systems without any designated cooling units. Apparatus 400 includes laser system 430 and heating system 440a. Laser system 430 and heating system 440a may be separate units and controlled separately or they may be incorporated into one unit. Material 410 is placed on conveyor 420 in a manner that laser system 430 can process material 410. Apparatus 400 is shown with material 410 that is laser-processed prior to heating by heating system 440a. In alternative embodiments, heating system 440a may be placed earlier in the conveyance system such that material 410 is preheated prior to processing by the laser system 430. In another embodiment, laser system 430 and heating system 440a may be combined as one unit and heating and laser-processing can occur simultaneously.

In some embodiments, laser cut area of the material is selectively treated. The heating is localized to the area treated, scored or cut with the laser. In other words, the entire surface area of the material is not heated but only the area close to the laser processed edges.

In some embodiments, the apparatus includes not only the systems for laser processing to cut and score the material and heating to reduce or eliminate odor but may also include components or systems necessary for converting the laser-processed and heated material into desired articles. A wide variety of devices are known to convert the cut and scored materials into articles and all of these may be used in conjunction with the laser-processing and heating systems described herein.

The reason for heating the laser processed material to reduce or eliminate odor is not understood and whatever mechanisms or theories may be implied by this disclosure, the patentability of this invention should not be held to any one theory. Factors considered to be at work include; diffusivity (odor particles lodged in the material), vaporization (including odor particles trapped in condensated material), increased oxidation at elevated temperatures (increased effectiveness of oxygen in the air at breaking down the odor causing byproducts), decomposition of the odor forming material, and the like.

The present invention is more particularly described in the following example which is intended as an illustration only since numerous modifications and variations within the scope of this invention will be apparent to those skilled in the art.

Example

Converting Using a Laser System

Paperboard was converted for use in packaging. A Preco Flexpro laser system was utilized to convert test samples utilized for odor reduction experiments. It is comprised of a $CO_2$ laser and various optical components, including a multi axis steered beam galvanometer.

The test pattern for converting comprised of an array of 43 1.461" long lines spaced 0.04" apart. This was centered about a 4 in sample coupon of material. The multi-axis steered beam system was used to deliver the laser beam. It was set at 100 in/sec and the laser power was set to cut through nearly 98% of the paper fibers (approximately 150 watts). As no odor detecting equipment was available the odor was evaluated via subjectively sniffing the material and comparing it to reference samples.

Heating Method 1

The laser converted sample was heated with a heat gun then cooled with shop air. The cycle was repeated 2 times. The heating involved exposing each flat surface of the sample to heat for a few seconds until hot. Cooling was accomplished by blowing shop air across the top and bottom surfaces of the sample for a few seconds each. The output temperature of the heat gun was measured at about 500° F. The opposite surface of the heat-treated sample reached between about 310° F. and 360° F.

Heating Method 2

Alternately, the laser converted sample was heated with a hot plate to elevate the temperature followed by cooling between two room temperature "cooling" plates. Again each surface was heated separately for a few seconds followed by the cooling for a few seconds. A single heating cycle as well as multiple heating/cooling cycles, were performed to see the benefits of odor reduction. As the odor reduction is subjectively evaluated it is difficult to determine the benefit of the 2" cycle. One heating cycle optimally applied appeared to be sufficient to provide the desired odor reduction in this method as well as the others. Exposure to about 400° F. for about 10 seconds allowed for significant odor reduction without scorching of the material.

Heating Method 3

A heated roller laminator was used to apply the heat to the laser processed samples. A Royal Sovereign RSH-380 unit was set at 302° F. setting (warmed up) and run at a speed setting of 4 or 9. Multiple passes were employed to increase effectiveness—1 pass front side one pass back side, repeated for 3 cycles. Some tests also included air cooling between passes. Wrapping the sample about the top roller (for approximately 30 deg wrap angle) was beneficial as it exposes more of the material to the elevated temperature for an increased time.

All of the methods described above resulted in elimination of at least about 95 percent of the odor compared to the material that was not treated with heat.

Heating Method 4

A heated press set at approximately 325° F. was used to apply heat to a laser converted sample. This press used only one heated platen. The laser converted sample was placed in one orientation (side 1 up) for approximately 3 seconds. The sample was then removed and allowed to cool for approximately 30 seconds. It was then flipped over and placed back into the heated press (side 1 down) for approximately 2 more seconds and was then removed and allowed to cool. Heating and cooling in this fashion helped to reduce/control the curling of the material.

Heating Method 5

A stack of 50-100 of the laser converted samples were stacked together and positioned between two ⅜ inch aluminum plates to hold them flat during heating. These stacks were then placed in an oven heated to approximately 350° F. for a period of several minutes. The time duration was such to allow the temperature of the center most samples to be elevated to a temperature sufficient to adequately reduce the odor. It was found that the samples would tend to curl when cooled and removed from between the plates. To further reduce the undesirable curling of the material the stack of 50-100 samples were wrapped in aluminum foil prior to being placed between the aluminum plates and subsequently into the oven. This reduced the moisture loss as the material was heated and therefore reduced the curling of the material post heat treatment. Increasing the relative humidity of the environment surrounding the heated samples is considered to be an alternative to wrapping the samples in aluminum foil.

Heating Method 6

A 10.6μ mid-IR $CO_2$ laser and a 1.06μ near-IR fiber laser were mounted adjacent to each other. The optical path and beam steering elements of each were configured and calibrated such that beam paths of a cut file for the two lasers were exactly overlapped on the common image plane. The near-IR laser was then defocused to ensure complete coverage of the paths traced by the 10.6μ beam. A red-color printed paper sample was placed at the image plane and was cut resulting in an distinct odor along the cut path. Without wrapping, stacking or shielding of the cut paper, the 1.06μ laser was allowed to trace the cut path of the material before the paper is removed. Upon inspection, the material was flat with no hue shift of the red color nor the odor smell associated with the laser cutting. The power density and the coupling of the 1.06μ laser to the paper were sufficiently low that no visible and physical evidence of the scanning action was seen along the cut path. Further analytical testing such as the use of GCMS apparatus confirmed the retention of the moisture in the material and no change of chemical components on the paper down to the residual component of siloxane left over from the ink printing process.

Heating Method 7

Discrete pieces of material to be processed and/or webbed material was held flat with a heated vacuum conveyor belt while being passed under a number of infrared heating sources. The material was already processed (cut) by a laser beam. The bottom of the material is heated via conduction from the temperature controlled vacuum belt and the top of the material is heated from infrared heating sources. The material is then transferred to a second, separate vacuum belt that transports the material to a cooling section that subjected the material to blown, cooled air Following is a short list of some of the other laser processed materials that were successfully odor reduced utilizing a heat gun as the heat source. The output of the heat gun was approximately 500° F. The samples were heated using a back and forth motion of the heat gun to reduce overheating. The temperature of the heated materials was not measured but was much less than the output of the heat gun.

Oak (unfinished)—engraved with four 1 inch long lines spaced 0.1 inch apart. The reference engraved sample (no odor reduction) still emits an obnoxious odor (reduced but still present) while the odor treated sample has no distinguishable odor difference from the natural oak. PET based 3M BEF film—cut with an array of eight 1 inch long lines spaced 0.1 inch apart.

Leather sample—cut approximately ½ way through the ⅛ inch thick sample with an array of eight 1 inch long lines spaced 0.1 inch apart. Again, the reference laser processed sample (no odor reduction) still emits an obnoxious odor (reduced but still present) approximately a year later while the odor treated sample has no distinguishable odor difference from the surrounding leather material.

For example, many of the applications described herein may not require all of the techniques and steps herein described. Some applications have curling issues while others may not and so there for retaining the material being processed to eliminate curling issues may be a step not required. Similarly, moisture loss or chemical composition may not be an issue in some applications and so other techniques described herein may not be needed.

Although the present invention has been described with reference to preferred embodiments, workers skilled in the art will recognize that changes may be made in form and detail without departing from the spirit and scope of the invention.

What is claimed is:

1. A method of reducing odors from a laser processed material comprising:
   laser processing a material by scoring or cutting with a laser beam to produce a laser processed material having a burnt odor;
   retaining the laser processed material in a substantially flat position to reduce curling; and
   heat treating the retained laser processed material by locally heating the laser processed area to a temperature such that heat treating alone is sufficient to substantially reduce the burnt odor wherein the material comprises a cellulosic material, a fibrous material, a paper-based material, or a manmade polymer, or combinations thereof.

2. The method of claim 1 wherein the material comprises polycarbonate, acrylic, polyester or combinations thereof.

3. The method of claim 1 wherein the method further comprises cooling of the material.

4. The method of claim 1 wherein the heating comprises the use of infrared sources of heat, heat gun, hot plate, heated roller, laser, oven, heat lamp, heated gas, microwaves or combinations thereof.

5. The method of claim 1 wherein the material is heated above 210° F.

6. The method of claim 1 wherein the material is treated to more than one cycle of heating and cooling.

7. The method of claim 1 wherein heating of the material does not lead to discoloration of the material.

8. The method of claim 1 wherein the odor is reduced by at least 90% compared to non heat treated material.

9. A method of reducing odors from a laser processed material comprising:
   laser processing a material by scoring or cutting with a laser beam to produce a laser processed material having a burnt odor;
   retaining the laser processed material in a substantially flat position to reduce curling;
   heat treating the retained laser processed material by subjecting the laser processed material to more than one cycle of heating and cooling such that heating and cooling alone is sufficient to substantially reduce the burnt order while the laser processed material is retained, the material comprising a cellulosic material, a fibrous material, a paper-based material, or a manmade polymer, or combinations thereof.

10. The method of claim 9 wherein the material comprises polycarbonate, acrylic, polyester or combinations thereof.

11. The method of claim 9 wherein the heating comprises the use of infrared sources of heat, heat gun, hot plate, heated roller, laser, oven, heat lamp, heated gas, microwaves or combinations thereof.

12. The method of claim 9 wherein the material is heated above 210° F.

13. The method of claim 9 wherein heating of the material does not lead to discoloration of the material.

14. The method of claim 9 wherein the odor is reduced by at least 90% compared to non heat treated material.

15. The method of claim 9 wherein the heating is localized to the laser processed area.

* * * * *